United States Patent [19]

Onozawa

[11] Patent Number: 5,607,886
[45] Date of Patent: Mar. 4, 1997

[54] OPTICAL GLASS FOR MOLD PRESSING HAVING SOFTENING CAPABILITY AT LOW TEMPERATURE

[75] Inventor: Masahiro Onozawa, Sagamihara, Japan

[73] Assignee: Kabushiki Kaisya Ohara, Japan

[21] Appl. No.: 540,204

[22] Filed: Oct. 6, 1995

Related U.S. Application Data

[63] Continuation-in-part of Ser. No. 432,083, May 1, 1995, abandoned.

[30] Foreign Application Priority Data

May 20, 1994 [JP] Japan .................................. 6-131381

[51] Int. Cl.$^6$ ...................................................... C03C 3/062
[52] U.S. Cl. ............................ 501/73; 501/47; 501/48; 501/77; 501/79; 501/903
[58] Field of Search ...................... 501/73, 45, 47, 501/48, 77, 79, 903

[56] References Cited

U.S. PATENT DOCUMENTS

| | | | |
|---|---|---|---|
| 2,423,128 | 7/1947 | Tillyer | 501/77 |
| 3,935,018 | 1/1976 | Ray et al. | 501/903 |
| 4,305,757 | 12/1981 | Yamashita et al. | 501/79 |
| 4,391,915 | 7/1983 | Meden-Piesslinger et al. | 501/48 |
| 4,439,529 | 5/1984 | Joormann et al. | 501/45 |
| 4,661,284 | 4/1987 | Cook et al. | 501/903 |
| 4,820,662 | 4/1989 | Izumitani et al. | 501/73 |
| 4,929,387 | 5/1990 | Hayden et al. | 501/47 |

*Primary Examiner*—Mark L. Bell
*Assistant Examiner*—Louis M. Troilo
*Attorney, Agent, or Firm*—Hedman, Gibson & Costigan, P.C.

[57] ABSTRACT

An optical glass having optical constants of a refractive index (Nd) from 1.50 to 1.60 and an Abbe number (vd) ranging from 62 to 73, a transformation temperature (Tg) of 550° C. or below, and barely cracks or sticks to metal molds when the glass is subjected to mold pressing, maintains excellent chemical durability, and having softening capability at a low temperature which can be obtained by restricting the composition of the glass in weight percents within a specific range of a $SiO_2$—$Al_2O_3$—$P_2O_5$—$R_2O$ system.

2 Claims, No Drawings

OPTICAL GLASS FOR MOLD PRESSING HAVING SOFTENING CAPABILITY AT LOW TEMPERATURE

CROSS REFERENCE TO RELATED APPLICATION

This application is a continuation-in-part of applicant's application Ser. No. 08/432,083, filed on May 1, 1995, which application is now abandoned.

BACKGROUND OF THE INVENTION

1. Field of the Invention

This invention relates to optical glass suitable for molding the same by mold pressing and having optical constants of a refractive index (Nd) of from 1.50 to 1.60 and an Abbe number (vd) ranging from 62 to 73, and further having a transformation temperature (Tg) of 550° C. or lower.

2. Description of the Related Art

Recently, a mold pressing-technique in which a softened gob (glass-lump) is press molded to produce directly optical elements has actively been developed. Increasly, there has been a need for such optical glass having characteristics of softening capability at a low temperature, i.e. a low transformation temperature (Tg), excellent chemical durability, and good releasability from metal molds when pressing the glass. A variety of phosphate optical glass products have been known heretofore as having optical constants of a refractive index (Nd) of from 1.50 to 1.60 and an Abbe number ranging from 62 to 73. In general, phosphate system glass has poor chemical durability, such that a variety of proposals for improving this defect have been made. For instance, low refractive index and low dispersion optical glass products having excellent chemical durability have been known from Japanese Patent Laid-open No.118045/1985 and No. 171244/1985. However, these glass products tend to be easily cracked in press molding. Furthermore, Japanese Patent Laid-open No. 218941/1991 discloses phosphate optical glass for use in a laser device. However, this optical glass sticks easily to metal molds when the glass is subjected to press molding.

U.S. Pat. No. 2,423,128 discloses a phosphate glass which has the composition consisting of the following, by weight percent; 50–75 $P_2O_5$, 2–10 $SiO_2$, 8–16 $Al_2O_3$, 1–10 $B_2O_3$ and 2–10 CaO, wherein said glass is substantially colorless and easily melted, and has no tendency toward crystallization during reforming. However, because this glass contains no alkali metal oxide at all, the transformation temperature of the glass is relatively high and therefore not suitable for the purpose of the present invention.

U.S. Pat. No. 4,391,915 discloses a phosphate glass which has the composition consisting of the following, by weight percent 45–55 $P_2O_5$, 3.5–9 $Al_2O_3$, 5–20 $K_2O$, 0–3 $Li_2O$, 8–15 BaO, 4.5–9ZnO, 0–6 MgO, 0–18 PbO, 0–1 $SiO_2$, 0–3 $B_2O_3$ and 0–2 $TiO_2$, wherein said glass is suitable for producing precision pressed optical components. This glass, however, is different in its essential ingredients from the glass of the present invention and in particular, has a lower $P_2O_5$ content, is an important ingredient as a network former in the glass of the present invention.

Fluorophosphate optical glass containing fluorine ingredient has a low dispersion property and is advantageous also from the standpoint of softening capability at a low temperature. In the fluorophosphate optical glass, however, the fluorine ingredient vaporizes during press molding at a high temperature and produces fog on the surface of a metal mold such that this fluorophosphate optical glass is unsuitable for an optical glass which is subjected to mold pressing.

It is, therefore, an object of the present invention to provide optical glass with improved properties such that the glass barely cracks when it is subjected to mold pressing, and has good releasability from metal molds, maintaing optical constants of a refractive index (Nd) of from 1.50 to 1.60 and an Abbe number (vd) ranging from 62 to 73 exhibits excellent chemical durability, and has softening capability at a low temperature.

SUMMARY OF THE INVENTION

Accumulated studies and experiments made by the inventor of the present invention for achieving the above described object of the invention have resulted in a finding which has led to the present invention. The present invention is an optical glass barely cracks and hardly sticks to metal molds when the glass is subjected to mold pressing maintains the above described optical constants, has excellent chemical durability, and exhibits softening capability at a low temperature said glass can be obtained by restricting the composition of the glass in weight percent within a specific range of a $SiO_2$—$Al_2O_3$—$P_2O_5$—$R_2O$ system.

The optical glass according to the present invention is characterized by consisting in weight percent of the following ingredients of:

| | |
|---|---|
| $SiO_2$ | 0.5–15% |
| $B_2O_3$ | 0–10% |
| $Al_2O_3$ | 7–20% |
| $P_2O_5$ | 56–80% |
| $Y_2O_3 + La_2O_3 + Gd_2O_3$ | 0–3% |
| in which | |
| $Y_2O_3$ | 0–3% |
| $La_2O_3$ | 0–3% |
| $Gd_2O_3$ | 0–3% |
| $TiO_2$ | 0–1% |
| ZnO | 0–5% |
| MgO | 0–10% |
| CaO | 0–5% |
| SrO | 0–5% |
| $Li_2O + Na_2O + K_2O$ | 8–25% |
| in which | |
| $L_2O$ | 0–3% |
| $Na_2O$ | 0–5% |
| $K_2O$ | 8–25% |
| $Sb_2O_3$ | 0–1%, | and having optical constants of a refractive index (Nd) of from 1.50 to 1.60 and an Abbe number(vd) ranging from 62 to 73.

DETAILED DESCRIPTION OF THE INVENTION

The above mentioned content ranges of the respective ingredients have been selected for the reasons stated below. In the following description, the content ranges of the respective ingredients are expressed in weight percentage.

In the present invention, it has been found that the $SiO_2$ ingredient is an important ingredient having an advantage for suppressing cracking of glass in situations of molding glass by mold pressing.

If the amount of the $SiO_2$ ingredient is below 0.5%, the above described advantage is not so remarkable, whereas if the amount or $SiO_2$ ingredient exceeds 15%, stability to devitrification is deteriorated.

The $B_2O_3$ ingredient is an ingredient having an advantage of reducing dispersion of glass, namely an ingredient effective for adjusting the optical constants, but if the amount of the $B_2O_3$ ingredient exceeds 10%, chemical durability of the glass is deteriorated.

The $Al_2O_3$ ingredient is effective for improving chemical durability of glass, but if the amount of the $Al_2O_3$ ingredient is below 7%, the advantage thereof is slight, while if the amount of this ingredient exceeds 20%, the tendency to devitrification of the glass increases. Furthermore, it has been found preferable to adjust a ratio in weight percent of $P_2O_5$ to $Al_2O_3$ to 10 or below in the present invention, so that the glass barely sticks to metal molds when the glass is subjected to mold pressing, The $P_2O_5$ ingredient is the major ingredient for composing the glass, but if the amount of $P_2O_5$ ingredient is below 56%, the above described optical constants cannot be maintained, whereas if the amount of $P_2O_5$ ingredient exceeds 80%, the chemical durability of glass is deteriorated.

$Y_2O_3$, $La_2O_3$, and $Gd_2O_3$ ingredients may be added for improving the chemical durability of glass and for adjusting the optical constants of the glass, but when the total amount of one or two or more of these ingredients exceeds 3%, tile glass is easily cracked when it is pressed.

The $TiO_2$ ingredient may be added to base glass ingredients for preventing solarization of glass and for adjusting optical constants of glass, but an amount of 1% or below thereof is sufficient for attaining the above described advantages.

The ZnO, CaO, and SrO ingredients may be added for adjusting the optical constants, but 5% or below of each of these ingredients is sufficient for achieving the above described advantage.

MgO is the ingredient which improves chemical durability. This ingredient has the advantage of elevating the chemical durability while keeping softening capability of glass at a low temperature in particular, in situations where low amounts of $Al_2O_3$ ingredient are present in the composition of the glass. However, if the amount of MgO exceeds 10%, the resulting glass is easily devitrified.

The $Li_2O$, $Na_2O$, and $K_2O$ ingredients are important ingredients for affording the glass a softening capability at a low temperature, as well as for improving melting property of the glass. Particularly, the $K_2O$ ingredient has a wider vitrifiable range than that of the other alkali metal oxides, such that if the amount of $K_2O$ is 25% or below, the resulting glass is remarkably stable, while on the otherhand, if the $Li_2O$ and $Na_2O$ ingredients exceed 5%, the resulting glass is easily devitrified. It is, however, to be noted that when a total amount of one or more of these ingredients exceeds 25%, the chemical durability of glass is deteriorated. Furthermore, a total amount of one or more of these ingredients is required to be 8% or more for maintaining a transformation temperature (Tg) at 550° C. or below.

$Sb_2O_3$ ingredient may, as an option be added as a clarifier, such that 1% or below of which is sufficient for attaining this purpose.

Also, as an option, the following other ingredients may be added to the present invention; $GeO_2$, $Nb_2O_5$, $Bi_2O_3$, $ZrO_2$, and SnO at an amount up to a total of 3% of these ingredients for adjusting optical constants, and improving solubility and stability to devitrification of the glass.

EXAMPLES

Examples of the optical glass, according to the present invention will now be described in comparison with Comparative Examples of the above described prior art glass. Table 1 shows, with regard to examples of composition of the optical glass in the present invention (Examples No. 1 to No. 10) and comparative examples of composition of the prior art optical glass(Comparative Examples No. 1 to No. 2), refractive indices (Nd), Abbe numbers (vd), transformation temperatures (Tg), and measured results of acid resistance (SR) together with results of a mold pressing test.

TABLE 1 unit: weight %

| No. | Examples 1 | 2 | 3 | 8 |
|---|---|---|---|---|
| $SiO_2$ | 5.0 | 0.5 | 15.0 | 2.0 |
| $B_2O_3$ | 10.0 | | 1.0 | 1.0 |
| $Al_2O_3$ | 7.0 | 18.0 | 9.0 | 11.0 |
| $P_2O_5$ | 56.0 | 57.0 | 60.0 | 70.0 |
| $Y_2O_3$ | | | | |
| $La_2O_3$ | | | | |
| $Gd_2O_3$ | | | | |
| $TiO_2$ | | 0.5 | 1.0 | |
| ZnO | 1.0 | | | |
| MgO | 10.0 | | 2.0 | 2.0 |
| CaO | | | | |
| SrO | | | | |
| $Li_2O$ | | 1.0 | 3.0 | |
| $Na_2O$ | | 3.0 | | |
| $K_2O$ | 11.0 | 20.0 | 8.0 | 14.0 |
| $Sb_2O_3$ | | | 1.0 | |
| ($P_2O_5/Al_2O_3$) | 8.00 | 3.17 | 6.67 | 6.36 |
| Nd | 1.5206 | 1.5188 | 1.5411 | 1.5107 |
| vd | 70.5 | 69.4 | 68.0 | 70.4 |
| Tg (°C.) | 540 | 465 | 481 | 510 |
| SR | 1 | 1 | 2 | 2 |
| sticking | O | O | O | O |
| cracks | O | O | O | O |

| No. | Examples 9 | 10 | Comparative Examples 1 | 2 |
|---|---|---|---|---|
| $SiO_2$ | 5.0 | 1.0 | | 2.0 |
| $B_2O_3$ | | | 4.0 | |
| $Al_2O_3$ | 10.0 | 8.0 | 13.0 | 6.7 |
| $P_2O_5$ | 72.0 | 80.0 | 70.0 | 67.9 |
| $Y_2O_3$ | | | | 4.2 |
| $La_2O_3$ | | | | 2.0 |
| $Gd_2O_3$ | | | | |
| $TiO_2$ | | | | |
| ZnO | 5.0 | | | |
| MgO | | 3.0 | | 3.6 |
| CaO | | | 2.0 | |
| SrO | | | 2.0 | |
| $Li_2O$ | | | | 1.0 |
| $Na_2O$ | | | | 4.0 |
| $K_2O$ | 8.0 | 8.0 | 9.0 | 8.6 |
| $Sb_2O_3$ | | | | |
| ($P_2O_5/Al_2O_3$) | 7.20 | 10.00 | 5.38 | 10.13 |
| Nd | 1.5345 | 1.5207 | 1.5286 | 1.5199 |
| vd | 70.0 | 71.4 | 70.1 | 70.2 |
| Tg (°C.) | 508 | 500 | 528 | 501 |
| SR | 1 | 2 | 2 | 4 |
| sticking | O | O | O | x |
| cracks | O | O | x | x |

The acid resistance test was conducted in accordance with the measuring method of ISO (International Organization for Standardization) 8424; 1987 (E), and the measured results are indicated in Table I wherein a value SR is graded for the time (hour) required for erosion in 0.1 μm of a glass sample in a prescribed acid treating solution. More specifically, SR values=1, 2, 3, and 4 indicate that the time required for the erosion in a nitric acid solution having pH 0.3 is 100 hours or longer, from 100 to 10 hours, from 10 to 1 hour, and from 1 to 0.1 hour, respectively.

As for the glass used for the mold pressing test, a piece or glass was cut off from a glass block formed by casting from melted glass and ground and polished to a ball having a diameter of 10 mm. For the mold pressing, a metal mold made of tungsten carbide was used. The mold assembly was housed in a glove box containing a reducing gas of 92% $N_2$ and 8% $H_2$. The glass in the metal mold was preheated by an induction coil to a temperature of 538° C. –520° C., at which viscosity of the glass used in the test becomes $\log\eta$=8.7 poises. The glass was pressed with pressing pressure of 85 kgf/cm$^2$ for 70 seconds and then the pressing pressure was reduced to 4 kgf/cm$^2$. The temperature was lowered to 270° C. over a period of 190 seconds and then the glass was moved from the metal mold to an annealing oven. As regards sticking of the glass to the metal mold, marks ○, Δ and x indicate a case where the glass does not stick to the metal mold within 50 pressing times, a case where the glass does not stick within 10 pressing times, and a case where the glass sticks within 10 pressing times, respectively. With respect to the cracking of the glass, marks ○, Δ and x indicate incidence of cracks of 2% or below, 10% or below, and a percentage higher than 10%, respectively.

The optical glass according to the present invention can easily be produced in such a manner that orthophosphoric acid, phosphoric pentoxide, metaphosphate or the like is suitably selected as a $P_2O_5$ raw material where raw materials of carbonate and nitrate are weighed and mixed with the $P_2O_5$ raw material in a prescribed ratio, and thereafter the mixture is introduced into a platinum crucible, molten at a temperature of 1000 to 1300 for 2 to 4 hours, depending upon the degree of difficulty in melting the mixture due to the composition thereof, and agitated to homogenize the molten mixture, The temperature of the molten mixture is reduced suitably, and the thusly treated molten mixture is cast into a metal mold and annealed.

As is apparent from Table 1, all the glass products of the examples according to the present invention exhibit excellent chemical durability, and besides they have the prescribed optical constants and the transformation temperature (Tg), yet are barely cracked in mold pressing, while having a good releasability from metal molds. Furthermore, all the glass products have an excellents stability to devitrification, and can be homogenized easily. Thus, the glass products of the above described examples can be easily produced, and are a suitable material for mold pressing.

As described in the foregoing, according to the optical glass of the present invention, by restricting the composition within a specific range in a glass of $SiO_2$—$Al_2O_3$—$P_2O_5$—$R_2O$ system, the optical glass obtained has the above described optical constants of a refractive index (Nd) of from 1.50 to 1.60 and an Abbe number (vd) ranging from 62 to 73, and the transformation temperature (Tg) of 550° C. or below, and furthermore the above described optical glass is barely cracked in mold pressing, and has a good releasability from metal molds, while keeping better chemical durability than that of the prior art optical glass.

It will be appreciated by those skilled in the art that the present invention can be embodied in other specific forms without departing from the spirit or essential characteristics thereof.

The presently disclosed examples are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Optical glass for mold pressing having softening capability at a low temperature, consisting in weight percent of:

|  |  |  |
|---|---|---|
|  | $SiO_2$ | 0.5–15% |
|  | $B_2O_3$ | 0–10% |
|  | $Al_2O_3$ | 7–20% |
|  | $P_2O_5$ | 56–80% |
|  | $TiO_2$ | 0–1% |
|  | ZnO | 0–5% |
|  | MgO | 0–10% |
|  | $Li_2O + Na_2O + K_2O$ | 8–25% |
| in which | $Li_2O$ | 0–3% |
|  | $Na_2O$ | 0–5% |
|  | $K_2O$ | 8–25% |
|  | $Sb_2O_3$ | 0–1% | wherein the ratio in weight percent of $P_2O_5$ to $Al_2O_3$ is between 3 and 10; and having a transformation temperature ($T_g$) of 550° C. or lower.

2. Optical glass for mold pressing having softening capability of a low temperature as defined in claim 1 wherein said optical glass has optical constants of a refractive index (Nd) of from 1.50 to 1.60 and an Abbe number (vd) ranging from 62 to 73.

* * * * *